June 22, 1965 A. V. CREWE 3,191,028
SCANNING ELECTRON MICROSCOPE
Filed April 22, 1963 6 Sheets-Sheet 1
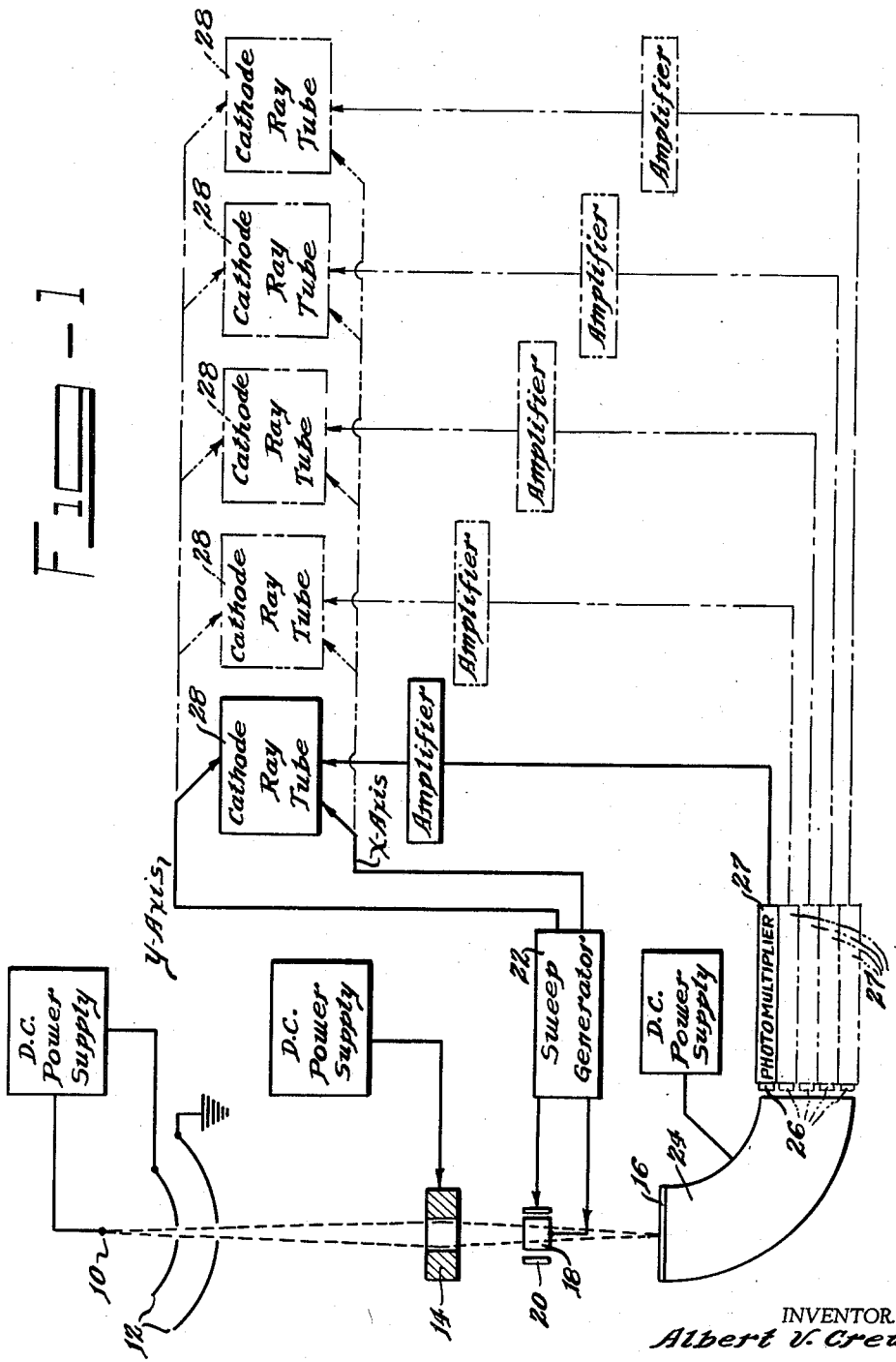
INVENTOR.
Albert V. Crewe
BY
Attorney

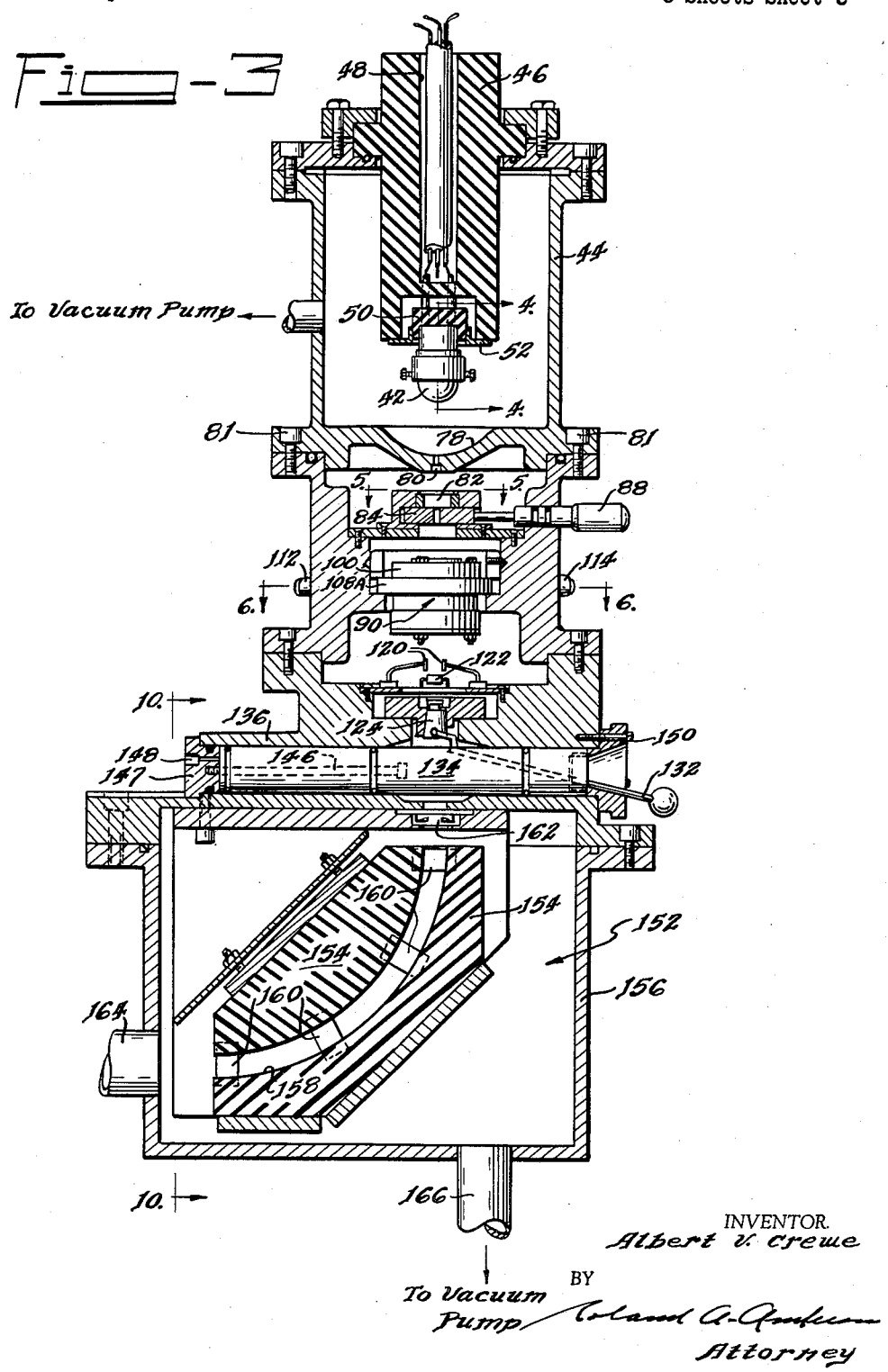

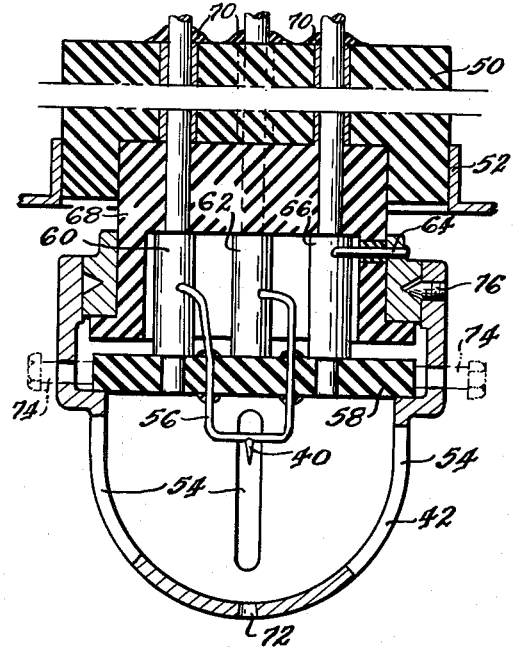

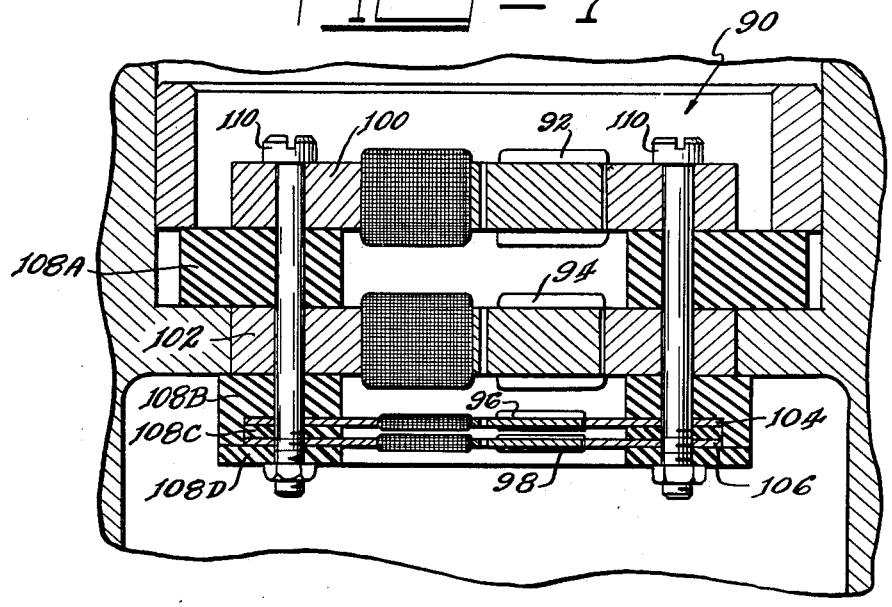
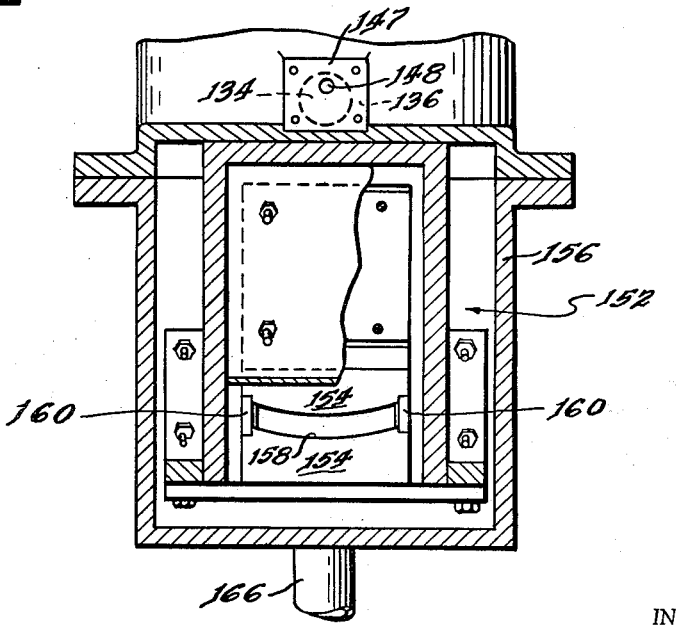

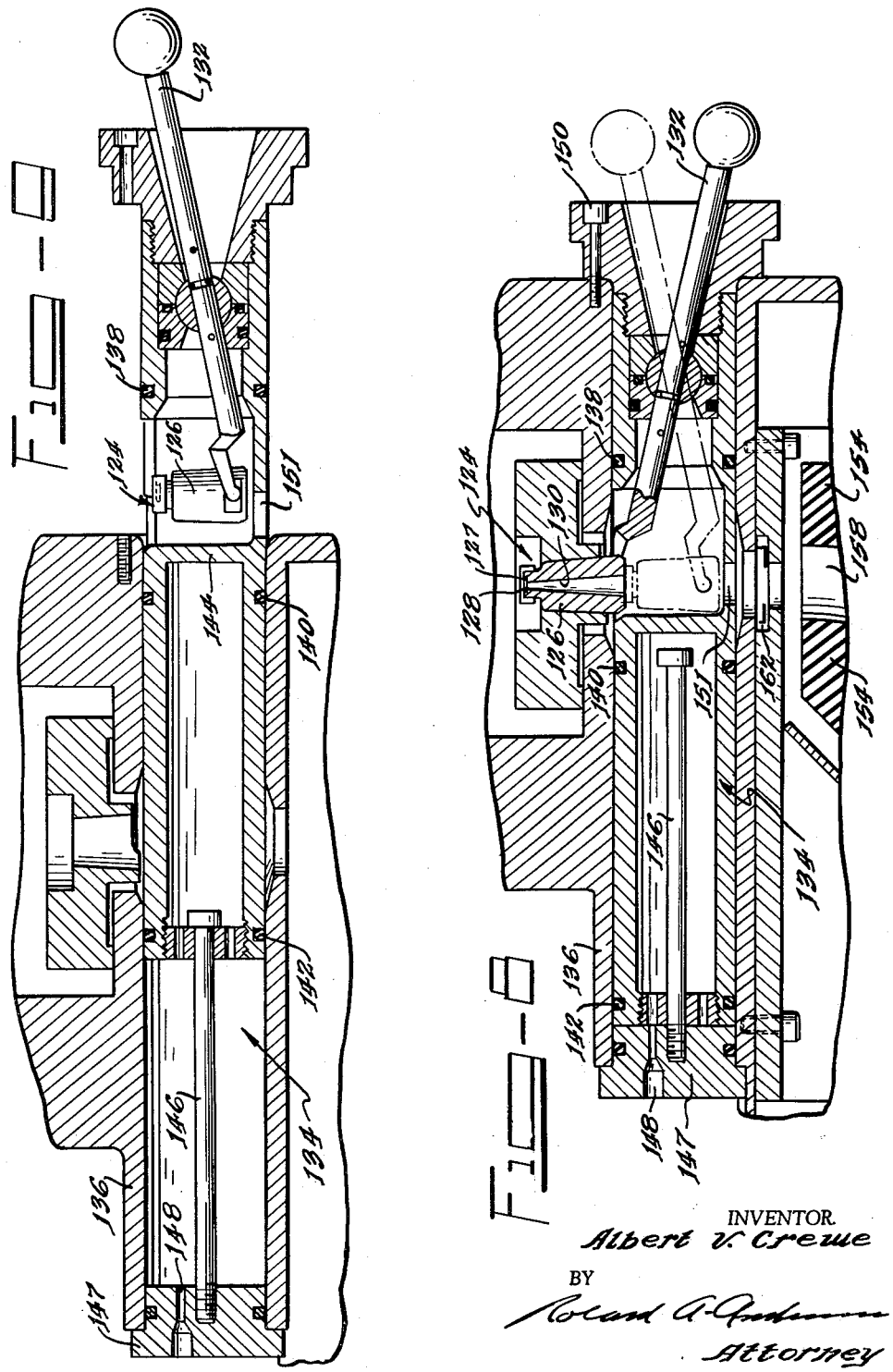

United States Patent Office 3,191,028
Patented June 22, 1965

3,191,028
SCANNING ELECTRON MICROSCOPE
Albert V. Crewe, Palos Park, Ill., assignor to the United States of America as represented by the United States Atomic Energy Commission
Filed Apr. 22, 1963, Ser. No. 274,878
13 Claims. (Cl. 250—49.5)

This invention relates to electron microscopes and more particularly to a scanning type electron microscope having high resolution and magnification which is capable of portraying the density per unit area distribution of specific chemical elements in a specimen and/or general specimen contour.

The conventional electron microscope, magnetic or electrostatic, employs a beam of monoenergetic electrons in the kilovolt region to illuminate a specimen having a thickness of approximately 100 A. The microscope uses a plurality of lens systems to collect and focus electrons passing through the specimen onto a fluorescent screen with resultant magnifications up to 50,000 diameters at resolutions up to 10 A. Electrons which pass through specimen may pass therethrough with virtually no deflection; or they may be elastically scattered by atoms in the specimen; or they may be inelastically scattered in the specimen. In general, it is these inelastically scattered electrons which create the resultant image since they are not perfectly focused by the lens systems. The inelastic scattering process is generally not the predominant one thereby giving difficulty in providing sufficient contrast in the display. Further, the resolution and hence magnification is limited because of the necessity of using a plurality of lens systems which are subject to imperfections and aberrations.

The electron microscope may also be of the scanning type wherein electrons from a point source are focused into a spot on the specimen and scanned thereacross. A plurality of lens systems are used to focus the transmitted electrons on a fluorescent screen display. Since this microscope also uses a plurality of lens systems subject to imperfections and aberrations, the resolution and magnification thereof is limited. Since spot focusing is used, a high density beam of electrons is required to produce an image on the screen. Thus, there will be insufficient contrast of the image if the electron density is too low, and if a sufficient electron density is used to give good contrast, then there is the danger of damage to the specimen being viewed.

A second type of scanning electron microscope is the X-ray scanning microscope. In this type, electrons are focused into a spot on the specimen and scanned thereacross. X-rays emitted by the interaction of the electrons are detected and displayed on a cathode ray tube whose sweep is synchronized with that of the electron scan. One of the main objections to this system is the requirement of a high density of electrons to produce sufficient X-rays to be counted thereby giving poor resolution (approximately 200 A.). Further, the system requires a thick specimen to produce sufficient X-rays.

None of the above electron microscopes are capable of recognizing specific chemical elements in the specimen and presenting a display of the density per unit area thereof while also presenting a magnified image of the specimen being observed.

It is therefore one object of the present invention to provide an electron microscope having improved magnification with high resolution.

It is another object of the present invention to provide an electron microscope utilizing only a single lens system.

It is another object of the present invention to provide an electron microscope capable of presenting a display of density per unit area distribution of specific chemical elements in a specimen.

It is another object of the present invention to provide an electron microscope capable of simultaneously presenting displays of density per unit area of different specific chemical elements in a specimen as well as contour of the specimen itself.

It is also another object of the present invention to provide a scanning type electron microscope using spot focusing of electrons on a thin specimen with a low density electron current.

It is yet another object of the present invention to provide a scanning type electron microscope using spot focusing of electrons on a thin specimen with a low density electron current and having high contrast in the display thereof.

Other objects will become more apparent as the detailed description proceeds.

In general the present invention comprises a point source of monoenergetic electrons with means for focusing the electrons into a spot on a specimen. Means are provided for raster scanning the focused electron spot over the specimen and a momentum analyzer is adapted to separate electrons transmitted through the specimen into discrete energy levels. A scintillation detector is positioned to detect the separated electrons at a discrete energy level thereof and a cathode ray tube, having the X and Y sweeps thereof synchronized with the raster sweep scan of the electron spot, is connected to the detector so that the display intensity of the cathode ray tube is responsive to the output of the detector.

More complete understanding of the invention will best be obtained from consideration of the accompanying drawings in which:

FIGURE 1 is a schematic representation of an apparatus embodying the basic principles of the present invention.

FIGURE 3 is a cross-sectional view of a preferred apparatus for practicing the present invention.

FIGURE 4 is a view of FIGURE 3 taken along lines 4—4 thereof.

FIGURE 5 is a view of FIGURE 3 taken along lines 5—5 thereof.

FIGURE 6 is a view of FIGURE 3 taken along lines 6—6 thereof.

FIGURE 7 is a cross-sectional view of the magnetic lens system of FIGURE 3.

FIGURE 8 is a cross-sectional view of the specimen stage of the apparatus of FIGURE 3.

FIGURE 9 is a cross-sectional view of the specimen stage of the apparatus of FIGURE 3 showing the specimen holder removed therefrom.

FIGURE 10 is a view of FIGURE 3 along lines 10—10 thereof.

Figure 2A:
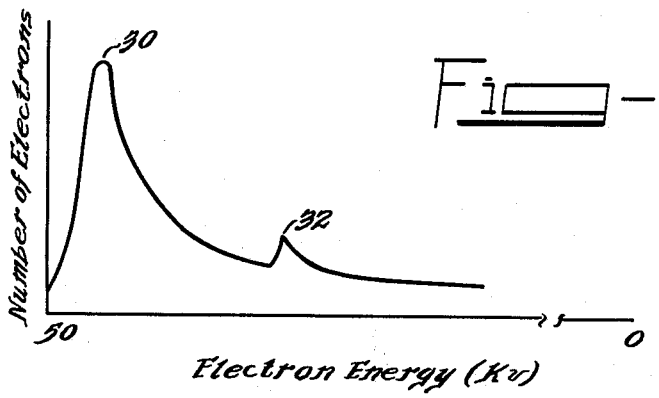
FIGURES 2A, 2B and 2C are graphical representations of transmitted electron energies.

In FIGURE 1, a point source 10 composed of a suitable material such as tungsten is used to produce electrons. Electrodes 12 accelerate these electrons and focusing magnets 14 then focus the electrons into a spot a few A. in diameter on the surface of a thin specimen 16. Deflection electrodes 18 and 20 are disposed between the specimen 16 and focusing magnets 14 and, responsive to voltages from scanning circuit 22, cause the electron spot to sweep over the surface of specimen 16 in a predetermined pattern.

A momentum analyzing spectrometer 24 is mounted after the specimen 16 and is adjusted to separate electrons transmitted through the specimen 16 into the discrete energy levels thereof. A scintillation detector 26 coupled to a photomultiplier 27 is mounted at the output of spectrometer 24 in a position so that it will detect electrons of a particular energy level. The output of detector 26 and photomultiplier 27 is fed to a cathode ray tube 28 where it modulates the intensity of the display thereof. The X and Y axis sweeps of the cathode ray tube 28 are driven by scanning circuit 22 so that their sweeps are synchronized with that of electrodes 18 and 20 whereby the display on the cathode ray tube 28 is synchronized with scanning of the electron spot over the surface of the specimen 16.

The foregoing description is intended to illustrate a general apparatus for the practice of the present invention. A more detailed description of a specific apparatus therefor will be given at a later time. For the purpose of facilitating understanding of the present invention the general theory of operation will now be discussed in relation to the apparatus of FIGURE 1 with some general design parameters therefor.

In the present invention electrons transmitted through the specimen 16 are counted individually. Thus, a low electron current (approximately $3 \times 10^{-9}$ amps) from the source 10 may be used while still maintaining a high contrast display. In order to obtain this value of electron current with a high beam quality a point source 10 is used. A tungsten point source 10 having electric fields thereabout of approximately $3 \times 10^7$ volts/cm. will produce a current density of $10^5$ amps./cm.$^2$. The accelerating electrodes 12 provide the electric fields necessary for the production of the electron current density of $10^5$ amps./cm.$^2$ and also accelerate the electrons to the desired electron voltage (approximately 50 kv.).

The electron beam will therefore emerge from the accelerating electrodes 12 as a divergent cone of electrons apparently emanating from an accurate point source and having a current density of $10^5$ amps./cm.$^2$ at a voltage of 50 kv. With the focusing magnets 14 adapted to receive a cone of half angle of $3 \times 10^{-3}$ radians, the electron current transmitted therein is approximately $3 \times 10^{-9}$ amps. The focusing magnets 14 accept the conical beam of electrons and focus it into a spot of approximately 10 A. in diameter on the specimen 16.

Figure 2B:
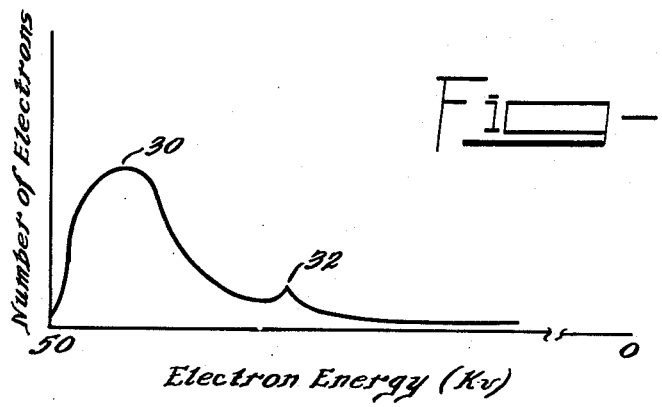
Figure 2C:
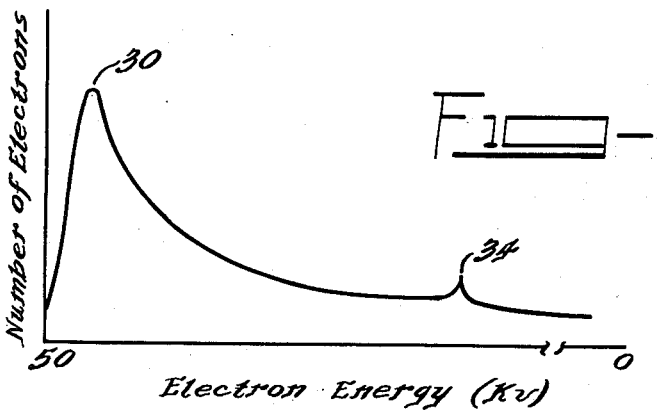

The focused electrons strike the specimen 16 and are transmitted therethrough so that they emerge therefrom with varying values of energy. The energy loss by the electrons in transmission through the specimen 16 is primarily due to two factors, the thickness of the specimen 16 and the characteristic absorption by specific chemical elements within the specimen. FIGURES 2A, 2B and 2C graphically illustrate the energy distribution for electrons transmitted through varying thicknesses of a specimen having different chemical elements therein. The electrons had an initial energy of 50 kv. FIGURES 2A and 2B illustrate the difference in transmitted electron energy for different specimen thicknesses containing the same chemical elements, FIGURE 2A being representative of a thinner section of a specimen than 2B. It will be noted from peaks 30 in FIGURES 2A and 2B that, as the specimen becomes thicker, the energy of the electrons is attenuated more and fewer electrons are transmitted having energies close to their initial 50 kv. The peaks 32 are representative of characteristic absorption by a particular chemical element within the specimen 16. It will be noted from FIGURE 2C which is drawn for the same specimen thickness as FIGURE 2A, but having a different chemical element therein that each particular chemical element in the specimen has its own characteristic energy absorption as illustrated by the energy level difference in peaks 32 and 34.

With momentum analyzer 24 mounted after specimen 16, the transmitted electrons may be separated into their discrete energy levels and a discrete energy level thereof be counted by the detector 26. The particular electron energy level to be counted may be determined by mounting the detector 26 in a fixed position and adjusting the analyzer 24 or by keeping the analyzer at a set value and varying the position of the detector 26. Thus, using the analyzer 24 and detector 26 in the manner described, electron energies may be selectively detected at the main transmitted peak 30 or at the smaller particular energy peaks 32 and 34 whereby presentations will be observed on the cathode ray tube 28 of general specimen contour or density distribution of particular chemical elements within the specimen 16. More than one presentation may be made simultaneously by the addition of more detectors 26 and cathode ray tubes 28 as shown in phantom in FIGURE 1. Thus, it is possible to simultaneously show a presentation of specimen contour similar to that in a conventional electron microscope and several presentations of density distribution of particular chemical elements within the specimen.

It is to be understood that the particular apparatus of FIGURE 1 is not to be limited to the various voltages and currents described above. These representative values were chosen to further illustrate the operation of the apparatus and to facilitate understanding thereof. It is to be further understood that the apparatus of FIGURE 1 is not to be limited to a magnetic focus lens system or to an electrostatic scanning system but that electrostatic focusing and magnetic scanning may also be used.

Turning now to FIGURES 3–10 wherein detailed drawings of a specific apparatus for the practice of the present invention are shown. Since the present invention uses a point source of electrons, it is necessary to prevent contamination of the source that it be operated in a high vacuum (approximately $10^{-9}$ mm. of Hg). However, it is not necessary to operate the rest of the system in such a high vacuum, a vacuum of $10^{-6}$ mm. of Hg will suffice therefor. Accordingly, the apparatus of FIGURE 3 is constructed so that it may be operated at two different values of vacuum ($10^{-9}$ mm. of Hg and $10^{-6}$ mm. of Hg).

In FIGURES 3 and 4, a tungsten point source 40 and a field forming electrode 42 are mounted within, but insulated from, a metal cylindrical shaped container 44. The source 40 and electrode 42 are insulated from container 44 by a cylindrical ceramic or glass insulator 46 having a passageway 48 therein for the passage of electrical connections to the electrode 42 and source 40. The electrode 42 and source 40 are attached to a cylindrical ceramic or glass block 50 which in turn is sealed to insulator 46 by seals 52.

The mounting of electrode 42 and source 40 is more clearly illustrated in FIGURE 4 taken along lines 4—4 of FIGURE 3. Field forming electrode 42 is hemispherical with slots 54 cut in the sides thereof to permit outgassing of the source 40. Tungsten source 40 is mounted on wire 56 which in turn passes through ceramic block 58 to be connected to terminals 60 and 62. The field forming electrode 42 is connected via wire 64 to terminal 66. Terminals 60, 62 and 66 pass through ceramic blocks 68 and 50 to passageway 48 in insulator 46, and are sealed to block 50 by seals 70.

Field forming electrode 42 has an aperture 72 therein to permit the passage therethrough of the electron beam from source 40. This aperture 72 has to be aligned along an axis with respect to the source 40. To facilitate this alignment, bolts 74 (shown in phantom) are threaded through the extension of electrode 42 into engagement with the end surfaces of ceramic block 58. By adjusting each of the bolts 74, the source 40 may be thereby positioned correctly with respect to the aperture 72. When the correct position is achieved, locking screws 76 are tightened and the bolts 74 removed to permit more efficient outgassing of the source 40.

It will be noted from FIGURE 3 that the lower surface of cylindrical container 44 is hemispherically shaped to form the accelerating electrode 78 for accelerating electrons from the source 40. The electrode 78 has an aperture 80 therein to permit the transmission therethrough of the electron beam and is also aligned with the aperture 72 of electrode 42.

To produce the aforementioned desired fields about the source 40 of $3 \times 10^7$ volts/cm., the source 40 is biased at $-50$ kv. and the field forming electrode is biased between $-45$ to $-48$ kv. with a radial separation between the source 40 and electrode 42 of 1 cm. The accelerating electrode is radially spaced 4 cm. from the source 40 and is maintained at ground potential with respect thereto.

By removing bolts 81 from the apparatus of FIGURE 3, the container 44 together with electrodes 42 and 78 and source 40 may be removed to permit outgassing thereof. Since as previously recited the present invention requires a point source operating in a high vacuum, the outgassing is a requirement so that the high vacuum may be attained. Prior to outgassing, the aperture 80 in electrode 78 is plugged. The cylinder 44 together with its contents are then baked at a temperature of approximately 400° C. while evacuation thereof is accomplished to a pressure of $10^{-9}$ mm. of Hg. Also, while this process is being accomplished, the source 40 is heated to a temperature of approximately 2000° C. by applying a heater voltage across terminals 60 and 62. This heating serves to form the source 40 so that it has a hemispherical surface and to outgas the source. When the outgassing has been completed, the container 44 is returned, with the vacuum maintained therein, to the apparatus of FIGURE 3 and the plug removed from aperture 80.

Since container 44 is operated at a high vacuum, all seals therein should be of a metal such as gold wire, copper, or aluminum so as to prevent contamination therefrom and permit baking thereof. Similarly, the container 44 together with any metal parts thereof should be of a non-contaminating metal such as 304 stainless, or copper.

Immediately following the aperture 80 in accelerating electrode 78 are two sets of adjustable slits 82 and 84 such as those commercially available from Gaertner Scientific Company. The slits 82 and 84 are mounted at right agles to each other and each has a micrometer setting adjustment 86 and 88 so that the width of each slit may be varied external to the apparatus of FIGURE 3. The mounting of the slits 82 and 84 is shown in further detain in FIGURE 5 taken along lines 5—5 of FIGURE 3. The slits 82 annd 84 together with apertures 72 and 80 limit the width of the electron beam to the magnet focusing lens system to a cone whose half angle is $3 \times 10^{-3}$ radians. For this purpose aperture 72 is ½ mm. in diameter and aperture 80 is 2 mm. in diameter.

Following slits 82 and 84 is the magnetic focusing lens system 90. For clarity of presentation the lens system 90 is shown in detail in FIGURE 6 taken along line 6—6 in FIGURE 3, and FIGURE 7 taken along line 7—7 in FIGURE 6. As shown in FIGURE 7, the lens system comprises two sets of quadrupole magnets 92 and 94 and two sets of octopole magnets 96 and 98 wound on magnetic cores 100, 102, 104 and 106 respectively. Spacers 108A, B, and C and D of a nonmagnetic material separate the magnetic cores 100, 102, 104 and 106 and rigidly hold the elements of lens system 90 in alignment with respect to each other by means of bolts 110 passing therethrough. The lens system 90 is externally aligned with respect to the axis of the beam by micrometer adjustments 112 and 114 shown in FIGURE 6. The micrometers 112 and 114 are mounted normal to each other and engage flat surfaces of spacer 108A. Spring loaded plungers 116 and 118 mounted at opposing faces of spacer 108A with respect to the micrometers 112 and 114 provide tension adjustment for the lens system 90.

Two pairs of plate electrodes 120 and 122 follow the magnetic focusing lens system 90 to provide electrostatic scanning of the focused electron beam. The plate electrodes 120 are mounted normal to the plate electrodes 122 so that scanning may be obtained in the X and Y axes of the plane of the specimen.

A removable stage 124 wherein the specimen is inserted follows the scanning electrodes 120 and 122. For clarity of portrayal and description, the stage 124 together with its related elements are shown in detail in FIGURES 8 and 9.

Basically the stage 124 comprises a holder 126 having a slot 127 wherein a thin specimen 128 of approximately 100 A. thick is mounted and a passage 130 therethrough for the transmission of the electron beam. A ball-pivoted arm 132 extending to the exterior is connected to the holder 126 and operates so as to raise and lower the holder 126 in and out of position. When the holder is in its lowered position, it rests within the interior of member 134 as shown in phantom in FIGURE 8.

Member 134 provides an air lock whereby the holder 126 may be removed to the exterior of the apparatus and the specimen 128 changed without losing the vacuum of the system. Member 134 is in slidable engagement with the wall 136 of the container and seals 138, 140 and 142 provide a vacuum tight engagement with respect thereto. The member 134 is closed about its midpoint by wall 144 so that one half thereof forms an open cylinder. A stop 146 attached to plug 147 in wall 136 of the apparatus extends into this open cylinder and the interior of the open cylinder is vented to the outside via passage 148 in plug 147.

In FIGURE 8 the member 134 is shown inserted within the apparatus of FIGURE 3. Seals 140 and 138 seal the member to the wall 136 of the apparatus. When it is desired to change the specimen 128, the arm 132 is raised, therby lowering the holder 126 to the position shown in phantom in FIGURE 8. Bolts 150 are removed and member 134 may then be withdrawn so that holder 126 is moved to the exterior as shown in FIGURE 9. This position is attained when member 134 engages the end of stop 146. It will be noted that seals 138, 140 and 142 provide a continuous seal to the wall 136 of the apparatus so that the vacuum thereof is never lost. Member 134 has an aperture 151 in the wall thereof for the passage of the electron beam therethrough.

Following specimen 128 and stage 124 is an electrostatic spherical analyzer 152 of conventional design as shown in FIGURE 3 and FIGURE 10 taken along lines 10—10 in FIGURE 3. Basically it comprises two quartz plates 154 mounted within a container 156. The quartz plates 154 are constructed and mounted so that they form a passageway 158 whose walls have a radius of curvature of 14 cm. and 16 cm. Quartz spacer blocks 160 provide correct spacing between the plates 154. The quartz plates are gold plated on the surfaces thereof which form passageway 158 and to which a voltage is applied to excite the analyzer 152 in specific modes of operation. A variable aperture diaphragm 162 is disposed between the specimen 128 and the passageway 158 of analyzer 152 whereby the width of the transmitted electron beam to the analyzer 152 may be controlled. The walls of container 156 have an aperture 164 for the transmission of the analyzer electron beam therethrough to a scintillation detector (not shown). The walls of container 156 also have a second aperture 166 through which the lower part of the apparatus of FIGURE 3 may be evacuated to a pressure of $10^{-6}$ mm. of Hg.

The detector or detectors for the apparatus of FIGURE 3 together with the electronic circuits therefor are similar to that shown in FIGURE 1 and hence will not be described in detail. It is to be understood that all electrical connections to the elements of the apparatus of FIGURE 3 pass through the walls thereof with vacuum seals.

A description of operation will now be given for the apparatus assembled as shown in FIGURE 3 with the system being maintained at vacuums of $10^{-9}$ mm. of Hg and $10^{-6}$ mm. of Hg as hereinbefore described.

A D.C. voltage of $-50$ kv. is impressed on terminal 60 or 62 and $-45$ to $-48$ kv. on terminal 64 with the apparatus being at ground potential. Thus a potential of $-50$ kv. is established on the source 40, $-45$ to $-48$ kv. on the field-forming electrode 42, and ground potential on the accelerating electrode 78. These voltages generate fields which cause an electron current density of approximately $10^5$ amps/cm.$^2$ to be emitted from source 40 at an energy level of 50 kv. Aperatures 72 and 80 in electrodes 42 and 78 together with slits 82 and 84 confine the emitted electrons to a conical beam having a half angle of approximately $3 \times 10^{-3}$ radians with a current therein of $3 \times 10^{-9}$ amps.

This beam is then accepted by quadrupole magnets 92 and 94 for main focusing of the beam into a spot approximately 10 A. in diameter on specimen 128. Each quadrupole set of magnets has its own D.-C. supply and by varying the voltage thereof, the focusing is varied. The octopole magnets 96 and 98 are used to provide correction for third-order aberrations and each set of magnets 96 and 98 has its own D.-C. supply therefor. A conventional demagnetization circuit should be used for both the octopole and quadrupole magnets 98, 96, 94 and 92 whenever the voltage thereto is removed so that uniform magnetic fields may be insured upon re-energization thereof.

The focused electron beam then passes through the deflection plates 120 and 122 which provide the scanning pattern over specimen 128. The voltages to the two sets of plates is provided by a sweep generator producing a saw-tooth waveform. Thus the beam is deflected in a raster scan over the surface of the specimen 128. In the present apparatus, the area of scan may be varied from 1000 A. x 1000 A. to 0.1 mm. x 0.1 mm.

As the electron beam is scanned over the specimen 128, the electrons will pass therethrough and emerge with an energy spectrum as hereinbefore described. By applying a particular voltage to the gold plating on quartz plates 154 of analyzer 152, the transmitted electrons may be separated into their discrete energy levels and the discrete energy levels be detected by scintillation detectors mounted at the terminus of the analyzer 152.

The display of the detected electrons at their discrete energy levels is the same as hereinbefore described for the general apparatus of FIGURE 1. With the apparatus of FIGURE 3, magnification greater than 100,000 X with resolution of approximately 10 A. may be obtained in displaying specimen element density and/or specimen contour.

Persons skilled in the art will, of course, readily adopt the teachings of the present invention to embodiments far different than those illustrated. Accordingly, the scope of the protection afforded the invention should not be limited to the particular embodiments shown in the drawings and described above but shall be determined only in accordance with the appended claims.

The embodiments of the invention in which an exclusive property or privilege is claimed are defined as follows:

1. A scanning electron microscope comprising field emission electron source means for generating a narrow beam of monoenergetic electrons, means for mounting a specimen, means for focusing said electron beam into a spot approximately 10–100 A. in diameter on said specimen, means for scanning said focused electron spot over the surface of said specimen, means for separating electrons transmitted through said specimen into discrete energy levels thereof, means for detecting said separated electrons at a discrete energy level thereof, a cathode ray tube, means for synchronizing the X and Y axis sweeps of said cathode ray tube with the scan of said electron spot, and means for connecting the output of said detecting means to said cathode ray tube whereby the display intensity thereof is responsive to the output of said detecting means.

2. The apparatus of claim 1 wherein said electron beam generating, focusing and scanning means operate in a partial vacuum of $10^{-9}$ mm. of Hg and said energy separating means operate in a partial vacuum of approximately $10^{-6}$ mm. of Hg.

3. The apparatus of claim 1 wherein said beam generating means comprise a tungsten point electron source, a first electrode hemispherical in shape radially disposed approximately 4 cm. from said source, a second electrode hemispherical in shape radially disposed 1 cm. from said source, each of said first and second electrodes having an aperture therethrough aligned with respect to said source to permit the free transmission of electrons, and means for applying a potential difference between said source and said second electrode and between said first and second electrodes.

4. The apparatus of claim 3 wherein a potential of −50 kv. is applied to said tungsten source, a potential of approximately −45 to −48 kv. is applied to said second electrode and said first electrode is at ground potential.

5. The apparatus of claim 4 further including means for limiting the widths of said beam to a cone whose half angle is approximately $3 \times 10^{-3}$ radians.

6. The apparatus of claim 1 wherein said focusing means comprise first and second sets of quadrupole magnets, first and second sets of octopole magnets, said quadrupole and octopole magnets being mounted and aligned so that said electron beam passes first through said quadrupole and then through said octopole magnets, and means for applying a variable voltage to each of said sets of magnets whereby said electron beam is focused into a spot on said specimen and third-order aberrations therein are corrected therefor.

7. The apparatus of claim 1 wherein said scanning means comprise a first pair of parallel plate electrodes spatially mounted with respect to each other so that said focused electron beam passes therebetween, a second pair of parallel plate electrodes spatially mounted with respect to each other so that said focused electron beam passes therebetween and mounted normal to said first plate electrodes, means for applying variable voltages to said first and second plate electrodes whereby scanning of said focused electron beam is obtained in two directions on the surface of said specimen.

8. The apparatus of claim 7 wherein said variable voltage applying means generates a saw-tooth voltage waveform.

9. The apparatus according to claim 1 wherein said electron separating means comprise a momentum analyzing spectrometer mounted adjacent said specimen and adapted to receive electrons transmitted therethrough, and means for applying a voltage to said spectrometer whereby electrons transmitted through said specimen are separated into discrete energy levels thereof.

10. The apparatus of claim 9 wherein said detecting means comprise a photomultiplier-coupled scintillation detector mounted adjacent the output of said spectrometer in a position to detect electrons at a discrete energy level.

11. A scanning electron microscope comprising field emission electron source means for generating a narrow beam of electrons having a current of approximately $3 \times 10^{-9}$ amps and an energy of approximately 50 kv. means for mounting a thin specimen, magnetic means for focusing said electron beam into a spot approximately 10−100 A. in diameter on said specimen, means for raster scanning said focused electron spot over the surface of said specimen, a momentum analyzing spectrometer adapted to separate electrons transmitted through said specimen into discrete energy levels thereof, a photomultiplier-coupled scintillation detector mounted at the output of said spectrometer in a position to detect electrons at a discreet energy level, a cathode ray tube, means for synchronizing the X and Y axis sweeps of said cathode ray tube with the raster scan of said focused electron spot, and means for connecting the output of said detector to said cathode ray tube whereby the display intensity thereof is responsive to the output of said detector.

12. A scanning electron microscope comprising field emission electron source means for generating a narrow beam of monoenergetic electrons, means for mounting a specimen, means for focusing said electron beam into a spot approximately 10—100 A. in diameter on said specimen, means for scanning said focused electron spot over the surface of said specimen, means for separating electrons transmitted through said specimen into discrete energy levels thereof, means for detecting said separated electrons at discrete energy levels thereof, a plurality of cathode ray tubes, means for synchronizing the X and Y axis sweeps of said cathode ray tubes with the scan of said electron spot, and means for connecting each detected discrete electron energy level output of said detecting means to an associated one of said cathode ray tubes, whereby the display intensity thereof is responsive to a detected discrete electron energy level.

13. The apparatus of claim 12 wherein said detecting means comprise a plurality of photomultiplier-coupled scintillation detectors mounted adjacent the output of said electron separating means in positions with respect thereto that each detector detects a discrete electron energy level, each of said detectors being connected to an associated one of said cathode ray tubes whereby the display intensity thereof is responsive to the output of the associated detector.

References Cited by the Examiner
UNITED STATES PATENTS

| | | | |
|---|---|---|---|
| 2,257,774 | 10/41 | Von Ardenne | 250—49.5 |
| 2,372,422 | 3/45 | Hillier | 250—49.5 |
| 2,418,317 | 4/47 | Runge | 250—49.5 |
| 2,444,700 | 7/48 | Hillier | 250—49.5 |
| 2,447,260 | 8/48 | Marton | 250—49.5 |
| 3,028,491 | 4/62 | Schleich | 250—49.5 |
| 3,103,584 | 9/63 | Shapiro et al. | 250—49.5 |

OTHER REFERENCES

The Scanning Electron Microscope and the Electron-Optical Examination of Surfaces, by D. McMullan from Electronic Engineering, February, 1953; pp. 46 to 50.

RALPH G. NILSON, *Primary Examiner*.